UNITED STATES PATENT OFFICE.

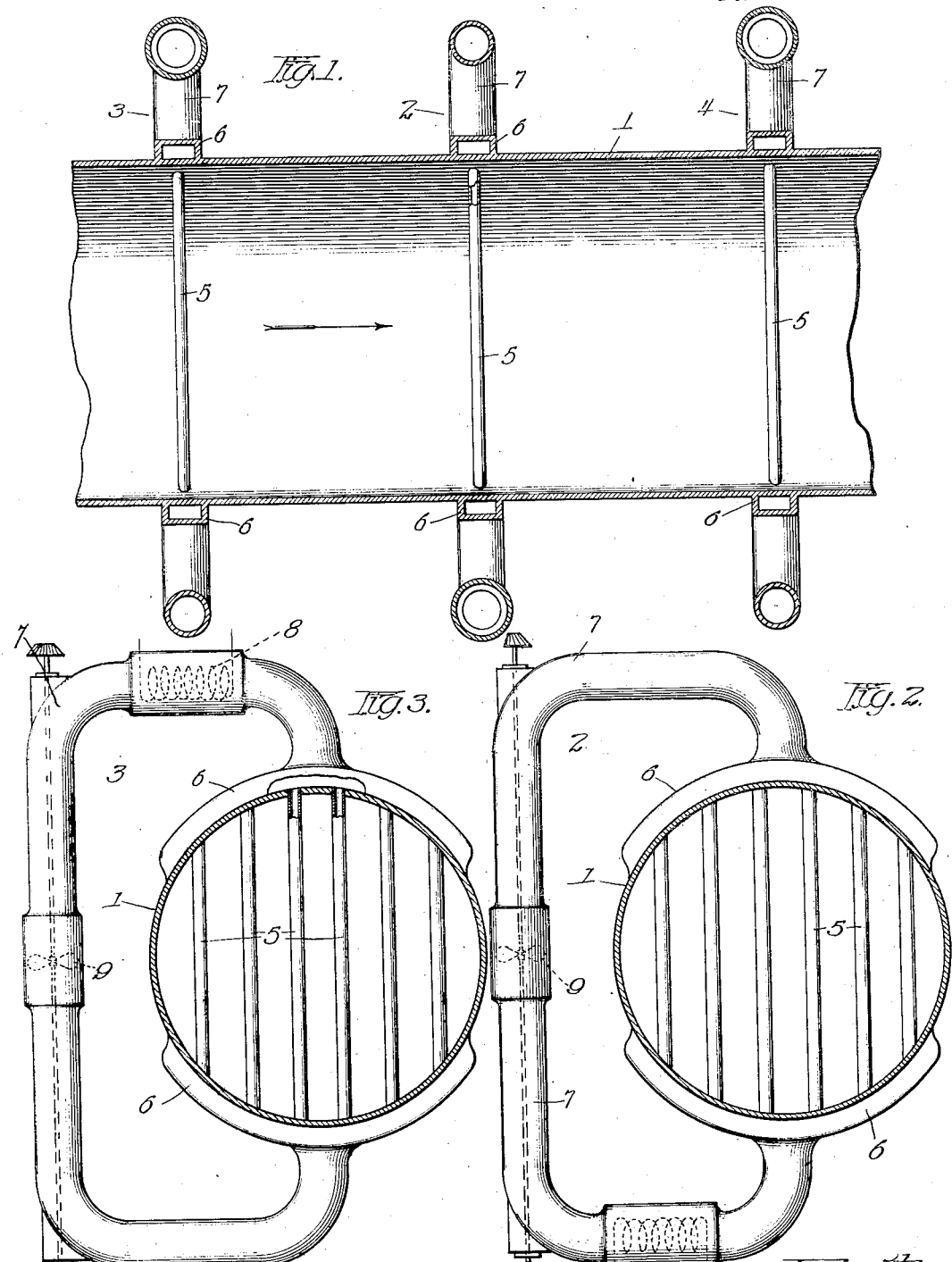

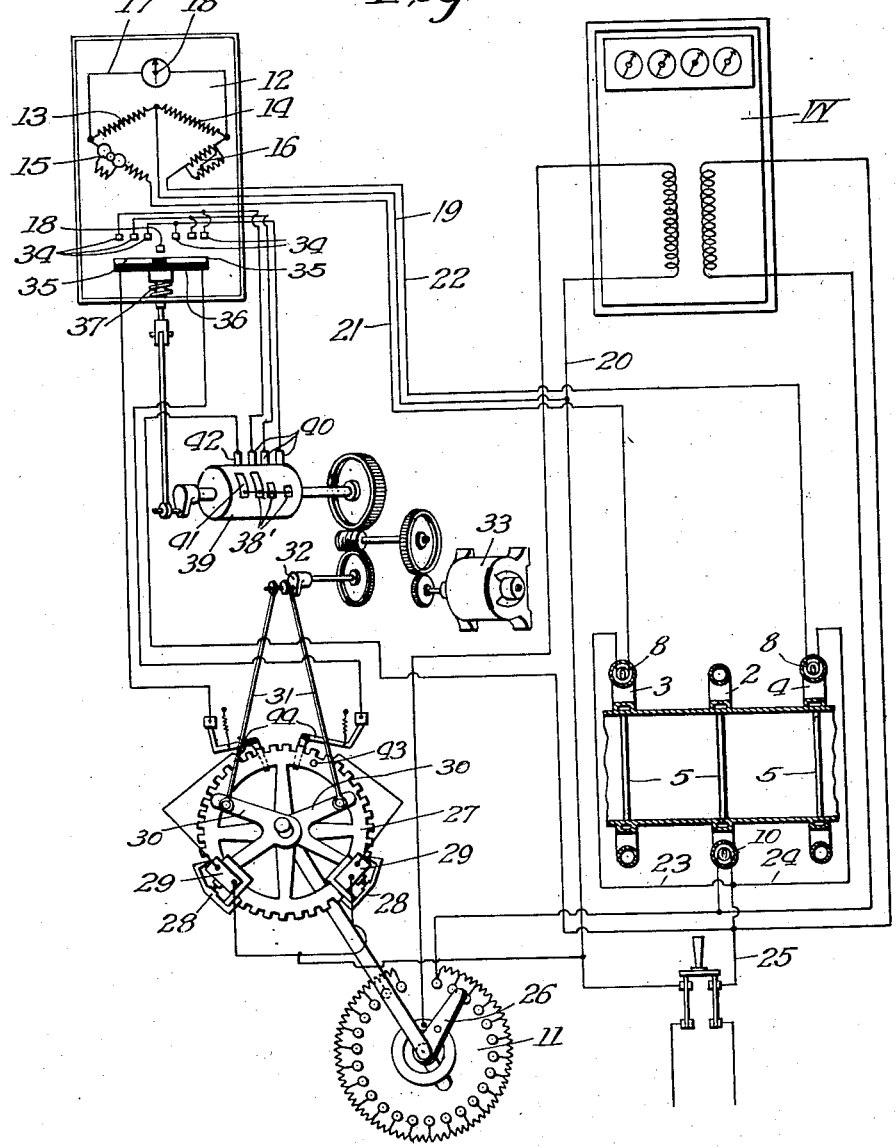

JOHN C. WILSON, OF MILWAUKEE, WISCONSIN, ASSIGNOR TO THE CUTLER-HAMMER MFG. CO., OF MILWAUKEE, WISCONSIN, A CORPORATION OF WISCONSIN.

FLUID-METER.

1,246,799.     Specification of Letters Patent.     Patented Nov. 13, 1917.

Application filed February 24, 1913. Serial No. 750,257.

*To all whom it may concern:*

Be it known that I, JOHN C. WILSON, a citizen of the United States, residing at Milwaukee, in the county of Milwaukee and State of Wisconsin, have invented new and useful Improvements in Fluid-Meters, of which the following is a full, clear, concise, and exact description, reference being had to the accompanying drawing, forming a part of this specification.

The invention relates to meters.

It relates particularly to meters in which thermal or thermodynamic effects are used for measuring the flow of fluids such as steam, gas, vapor and the like.

Various meters of this type have been devised which operate in general as follows:

The specific heat of the fluid to be measured being known, the flow thereof is measured by determining the effect of heat transfer between a stream of said fluid and a source of heat subjected thereto. The rate of heat transfer and the effect of the heat transfer on the fluid may both be measured and the results compared to obtain the rate of flow or either the rate of heat transfer or the effect of the heat transfer on the fluid may be kept constant and the other variable measured to determine the rate of flow. The patent to C. C. Thomas, No. 1,222,492, of April 10, 1917, describes in detail a meter of this type.

One of the objects of this invention is to provide a meter of this general type having novel features which render it better adapted for use under certain adverse conditions of service.

Another object is to provide an improved method for measuring the flow of fluids.

Another object is to provide an improved meter in which the resistance material of the electric heater and thermometers is not in contact with the fluid being measured.

Another object is to provide improved heating and temperature measuring apparatus which is adapted to resist chemical action by gases, and which is constructed so that it can be readily opened for inspection and repair without interrupting the flow of fluid.

An embodiment of the invention is illustrated in the accompanying drawings. The views of the drawings are as follows:

Figure 1 shows a central longitudinal sectional view of a main with the units in position therein.

Fig. 2 shows a side elevation of the heating unit.

Fig. 3 shows a side elevation of the resistance thermometer with a portion of the casing broken away.

Fig. 4 is a diagrammatic view showing the automatic mechanism associated with the meter for maintaining a constant temperature rise of the fluid passing therethrough.

The steam, gas or vapor whose flow is to be measured passes through the conduit or main 1, in the direction indicated by the arrow. Said fluid is heated as it passes the heating unit 2, the construction of which is hereinafter described. The temperature of the fluid prior to the heating thereof, is measured by a thermometer unit 3 and its temperature after heating is measured by an additional thermometer unit 4, arranged on the opposite side of the heater unit. The difference in temperature indicated by the two thermometer units furnishes a basis for determining the flow, where the heat is dissipated at a constant rate from the heater unit, or, if the rate of heat dissipation is varied to maintain a constant temperature difference between said two thermometers, the said variations furnish the desired basis for calculations.

In the prior type of meter referred to, the heater element and the two thermometers all consist of screens of resistance wire arranged in the conduit, whereby they are directly exposed to the stream of steam, gases or vapors, and hence, under certain conditions of service are subject to deterioration on the one hand or to a gradual coating of various substances deposited by the fluid, on the other hand. The heater resistance is heated electrically, the amount of heat dissipated being determined by measuring the electrical energy required during the operation of the meter. The temperature rise is indicated by changes in the resistance of the thermometers.

In the present case, although I employ preferably electrical resistance material to perform a function similar to that described, said resistances are not located in the stream of fluid, but outside of the conduit, and influence the said stream and are influenced by it, through the medium of a circulating fluid, preferably currents of air which circulate past said resistances and through tubes which pass through said conduit from one side to the other.

The preferred structural arrangement of the resistance thermometers 3 and 4, which are preferably alike, is that of a plurality of pipes or tubes 5 which extend transversely across the main, as shown in Fig. 3, and are connected at their ends to headers 6. These headers are connected by an external pipe 7 which extends around one side of the main and in which the resistance 8 and an air circulator or fan 9 are provided. Obviously, the heated air, liquid or other circulating medium inclosed in the tube will assume approximately the temperature of the fluid passing through the main and will bring the resistance thermometer 8 to approximately the same temperature as said fluid.

The heater unit 2 shown in Fig. 2 is of substantially the same construction as the resistance thermometers, being provided with similar pipes 5 and headers 6, and connecting pipe 7 outside of the main, as well as an air circulator 9. In this instance, the heater unit 10 is located at the lower end of the pipe 7, the heat energy dissipated by the heating unit being conveyed by the air circulating medium to the pipes 5.

Obviously, by connecting the resistances to automatically controlled devices such as described in the above mentioned patent to C. C. Thomas, the method of operation of the meter will be substantially the same as that described in that application; the automatic control system tending to maintain a constant temperature difference, and through the indicating instruments used in connection with that system, serve to indicate the quantity of gas passing through the main, irrespective of variations in the temperature or pressure thereof. Fig. 4 shows the combination of the herein described type of meter with the automatically controlled devices of the type illustrated in the aforesaid patent. The automatically controlled devices themselves form no part of the present invention and are not herein claimed.

In Fig. 4 the heating current supplied to the heating coil 10 is measured by a wattmeter W and is varied by a rheostat 11. This rheostat is arranged to be operated and adjusted automatically by mechanism comprising an automatically controlled switch 12 which includes a Wheatstone bridge and galvanometer, the needle of the galvanometer forming one contact member of the controlling switch.

In the upper part of the illustration of the controlling switch 12 there are illustrated diagrammatically the conductors of the Wheatstone bridge comprising resistances 13, 14, 15 and 16 and a cross wire 17 connected to a galvanometer of which 18 is the needle. In the lower part of the illustration of switch 12 the needle 18 is shown in its actual position. A conductor 19 connects resistances 13 and 14 of the Wheatstone bridge to one current lead 20 of the heating coil 10 and other conductors 21 and 22 connect resistances 15 and 16 respectively of the Wheatstone bridge to the thermometer resistances. The thermometer resistances 8 are connected by conductors 23 and 24 to the other current lead 25 of the heating coil 10. It will be apparent from the connections shown that when by the action of the heating coil 10 the temperature of the steam or gas passing through the conduit 1 is raised so as to vary the resistance of one coil 8 with respect to the resistance of the other coil 8 and thereby vary the resistance on the corresponding side of the Wheatstone bridge the galvanometer will be deflected.

The contact arm 26 of the rheostat is rotated in one direction or the other by a ratchet wheel 27 and electrically operated pawls 28, operated by electromagnets 29 to increase or decrease the resistance. Each pawl is carried by a wrist-plate 30 which is oscillated continuously by a pitman 31, driven by a crank 32, which is rotated continuously by a motor 33 through suitable reduction gearing. The pawls 28 are normally out of mesh with the teeth on the ratchet wheel 27, but either pawl may be drawn into engagement with said teeth upon the energization of the corresponding electromagnet 29 to impart a step-by-step rotation to said ratchet wheel.

The energization of the magnets 29 is controlled by the galvanometer needle 18 which swings freely about its pivot when the Wheatstone bridge is unbalanced. A plurality of contacts 34 are arranged directly above the needle in two groups. Two contact strips 35 are mounted directly beneath said needle on a suitable insulating support 36. The insulating base 36 is yieldingly mounted as shown at 37 and is moved up and down continuously, being connected to the motor 33 through suitable reduction gearing and links. The arrangement is such that if the needle 18 is deflected to one side or the other the elevation of the contact strips 35 will cause said needle to be clamped for a definite interval of time between one of said strips and one of the several contacts immediately above the needle. The circuit to one or the other of the electromagnets 29 is thereby closed temporarily through said needle. The circuit is also completed through one of the three contact strips 38, mounted on the controlling drum 39, and stationary brushes 40, which coöperate with said contact strips. The circuit is further closed through the contact strip 41, and the coöperating brush 42, the contacts on the drum being all electrically connected as shown. The drum 39 is rotated continuously by the motor 33, the arrangement being such that contact strips 38 pass under the brushes 40 while the needle is being clamped in circuit closing position. The three contact strips 38 are of different lengths and accordingly if the needle 18 is deflected only a slight distance to the right or the left the circuit to the corresponding electromagnet 29 will be closed for a short interval of time only, during the time that the right-hand strip 38, which is the shortest, remains in contact with its corresponding brush. If the deflection of the needle is a maxium the circuit to the corresponding electromagnet 29 will be closed the maximum interval of time corresponding to the time that the longest contact strip 38 is in contact with its corresponding brush. In the first case assumed, the pawl is not brought into engagement with the ratchet wheel until near the completion of the upward stroke of the corresponding wrist-plate 38, and accordingly the ratchet wheel is rotated a distance, depending on how much the needle swings. If the circuit is completed through the longest strip 38 the pawl is attracted at the beginning of the upward stroke and the ratchet wheel is rotated the maximum amount, corresponding to three teeth. If the circuit is closed through the intermediate contact strip an intermediate movement of the contact arm 26 results. It is apparent that the number of contact strips and coöperating parts may be varied at will to give any desired movement to the rheostat arm.

By virtue of the above arrangement the needle is free to turn most of the time and its movement is not restricted by friction in sliding over a series of contacts. Furthermore, the circuit is broken between the contact strips 38' and the brushes 40 before the needle is released from clamped position. Accordingly, arcing at the needle is prevented.

In order to prevent movement of the rheostat arm 26 beyond the usual intended limits the ratchet wheel 27 is provided with a pin 43 which trips either one or the other of the two cut-out switches 44, thereby opening the circuit to the corresponding electromagnet 29 and preventing further movement of the rheostat arm in one direction but not in the other.

It will therefore be seen that in Fig. 4 the electric energy supplied to the heater coil 10 is varied automatically to maintain a constant temperature rise of the fluid because any variation in the temperature will serve to actuate the rheostat 11 by the automatic mechanism above described.

I find that a meter of the construction shown herein is particularly adapted to use in connection with fluids that are very dirty, such for instance as blast furnace gases, and that the accurate operation of the meter is not materially affected by the accumulation of dirt upon the resistance unit. Also, the parts of the resistance unit which are inside the main may be of a very rugged construction and of materials which readily resist the chemical action of the gases flowing in the main. Further, both the heater and resistance units can be readily removed from the main without interrupting the flow of fluid therein.

While I have specifically described one embodiment of my invention in this application, I do not limit myself to the construction or grouping of elements shown, since this construction is susceptible of modification. For example, the heater is, in a sense, independent of the type of thermometer employed, and the latter may be, therefore, of some other form. On the other hand, an entirely different type of heater may be used with thermometers of the type described. Furthermore, various different circulating mediums may be employed other than air or gas. In general, therefore, I desire to cover all suitable equivalent means for accomplishing the desired results wherever such means fall within the scope of the appended claims.

What I claim as new and desire to secure by Letters Patent of the United States is:—

1. A fluid meter having a chamber through which passes a stream of the fluid whose flow is to be measured, a heater, means for confining a heat conveying medium adjacent said fluid stream and adjacent the heater so that the heater dissipates heat to said fluid through said medium although out of direct contact with the fluid, and means for measuring the effect on the fluid of the heat transfer.

2. A fluid meter having a conduit through which passes the fluid whose flow is to be measured, a heating element outside of said conduit, and a housing for said heating element, said housing having a portion thereof arranged in the conduit.

3. In a meter, a chamber through which passes the fluid whose flow is to be measured, a current conducting element which varies its resistance with changes in temperature, and means for confining a heat-conveying medium adjacent to said passing fluid and adjacent to said conductor, whereby the temperature of said medium is controlled by the temperature of the passing fluid and whereby the resistance of said conductor is in turn controlled by the temperature of said medium.

4. In a meter, a conduit through which passes the fluid whose flow is to be measured, a resistance element, a housing for said resistance element, said housing having portions arranged within said conduit and a medium within said housing to convey heat from the fluid in the conduit to the resistance element or vice versa.

5. In a meter, a conduit through which the fluid flows, an electrical resistance element arranged outside of said conduit, a tube passing through said conduit, and an inclosing chamber in which said resistance is arranged, said chamber communicating with opposite ends of said tube.

6. In a meter, a conduit through which fluid flows, a heat dissipating element arranged outside of said conduit, an inclosing chamber in which said element is located, and a plurality of tubes, each having both ends in open communication with said chamber, said tubes passing through said conduit.

7. A fluid meter having a chamber through which flows a stream of the fluid to be measured, a heater, a closed system of piping associated with said chamber within which piping a circulating medium is confined, said heater being arranged to heat the circulating medium, and means for insuring a continuous circulation of such medium so that the medium acts as a heat-conveying means between the heater and the fluid in the chamber, and means for measuring the effect on the fluid of the transfer of heat thereto.

8. A fluid meter having a chamber through which passes a stream of the fluid to be measured, a heater for heating the fluid flowing through said chamber, means on each side of said heater for directing a heat-conveying medium through said chamber but out of contact with said fluid and thermometers responsive to the temperature of the heat-conveying medium whereby the thermometers measure the temperature of the fluid before and after it passes the heater.

9. A meter comprising a heating unit and a thermometer unit arranged on each side thereof, each of said units comprising a closed loop of piping within which a resistance element is arranged.

10. In a meter, a conduit, a series of pipes passing through said conduit substantially transverse with respect to said conduit, headers on opposite sides of said conduit with which said pipes communicate, a tube connecting one of said headers with the other externally of said conduit, an electrical resistance element arranged in said pipe, and means for causing the continuous circulation of the medium confined within said elements.

11. The method of determining the rate of flow of fluids which consists in imparting heat to a circulating medium which conveys said heat to the fluid whose flow is to be measured, and determining the rise in temperature of said fluid by means of further circulating mediums which assume the temperature of said fluid before and after heating.

12. The method of determining the rate of flow of fluids which consists in imparting heat to a circulating medium which conveys said heat to the fluid whose flow is to be measured whereby said fluid tends to become hotter and the said circulating medium tends to become cooler by virtue of the transfer of heat from one to the other, and determining the effect of said heat transfer on one of the said elements affected thereby.

13. A fluid meter having a chamber through which the fluid to be measured flows, means for dissipating heat to the fluid flowing in said chamber, resistance thermometers outside the said chamber and means for causing the resistance thermometers to be responsive to the temperature of the fluid.

14. A fluid meter having a chamber through which a stream of the fluid to be measured flows, means for transferring heat to the fluid flowing in said chamber, thermometers for measuring the temperature of the fluid before and after heating, and means for directing a heat-conveying medium through said chamber and adjacent said thermometers to cause said thermometers to be responsive to the temperature of the fluid on opposite sides of the heating means without being in direct contact with the fluid.

15. A fluid meter having a chamber through which the fluid to be measured flows, a heating element outside of said chamber, means for conveying heat from the heating element to the fluid within the chamber, resistance thermometers on the outside of said chamber and means for transmitting the temperature of the fluid being measured to the resistance thermometers.

16. A fluid meter having a chamber through which the fluid to be measured flows, a heating element outside of said chamber, means for conveying heat from the heating element to the fluid in the chamber and resistance thermometers responsive to the temperature of the fluid on opposite sides of the point of application of the heat to the fluid.

17. The method of measuring the flow of fluid which consists in imparting heat to said fluid at a determinable rate by means of another flowing fluid and measuring the effect on the fluid being measured of the heat transfer.

18. The method of measuring the flow of fluid which consists in passing a medium having a different temperature than the said fluid into proximity to a stream of said fluid, determining the rate of heat transfer and measuring the effect on the fluid of the heat transfer.

19. The method of measuring the flow of fluid which consists in causing a heat transfer at a determinable rate between a stream of said fluid and another stream of flowing fluid subjected thereto and measuring the effect on the fluid being measured of the heat transfer.

20. A fluid meter comprising a conduit through which a stream of the fluid to be measured flows, means for passing a stream of fluid into heat exchanging relation to the first fluid to cause a heat transfer at a determinable rate and means for measuring the temperature of the fluid being measured before and after the heat transfer.

21. A fluid meter comprising a conduit through which a stream of the fluid to be measured flows, means for passing a stream of fluid to which heat is supplied at a determinable rate into heat exchanging relation to the stream of fluid being measured and means for determining the effect on the fluid being measured of the heat transfer.

22. A fluid meter comprising a conduit through which a stream of the fluid to be measured flows, means for heating said fluid and means for measuring the temperature of the fluid before and after heating, each of said means comprising a closed loop of piping having a portion thereof passing through the conduit and having means for circulating a medium through said piping and past an electric resistance located in the piping.

23. A fluid meter comprising a conduit through which a stream of the fluid to be measured flows, three systems of closed loop piping spaced apart, each system having a portion thereof extending across the interior of the piping, means in each system for circulating a medium therethrough, a heater within the central system for causing the medium therein to be heated to transfer heat to said fluid, and thermometers in the other systems to measure the temperature of the medium therein to obtain the temperature of the fluid before and after passing the central system.

24. A fluid meter comprising a conduit through which a stream of fluid to be measured flows, three systems of closed loop piping spaced apart, each system having a portion thereof extending across the interior of the piping, means in each system for circulating a medium therethrough, an electric heater within the central system for causing the medium therein to be heated to transfer heat to said fluid, and electric resistance thermometers in the other two systems to measure the temperature of the medium therein to obtain the temperature of the fluid before and after passing the central system.

25. The method of determining the rate of flow of a fluid which consists in supplying heat to a fluid medium which is brought into heat exchanging relation with the fluid whose rate of flow is to be measured, and determining the rate of flow from the effect of the heat transfer between the medium and the fluid for the purpose described.

26. The method of determining the rate of flow of a fluid which consists in effecting a heat transfer between the fluid to be measured and a fluid medium, imparting heat to the fluid medium in such a manner as to keep constant the temperature rise of the fluid to be measured and measuring the quantity of heat required to maintain said temperature rise constant.

27. Apparatus for measuring the rate of flow of a fluid comprising a conduit through which the fluid to be measured flows, means for positively bringing a fluid heating medium into heat exchanging relation with the fluid flowing in said conduit, and means for measuring the temperature effect of the heat transfer between said medium and the fluid.

28. Apparatus for measuring the rate of flow of a fluid comprising a conduit through which the fluid to be measured flows, means for bringing a fluid medium into heat exchanging relation with the fluid in said conduit, an electric heater for heating the fluid medium, and means for automatically varying the electric energy supplied to said electric heater to maintain a constant temperature rise of the fluid flowing in the conduit.

In witness whereof, I have hereunto subscribed my name in the presence of two witnesses.

JOHN C. WILSON.

Witnesses:
HENRY F. VOGT,
OSCAR A. KELLER.